United States Patent [19]

Watanabe et al.

[11] Patent Number: 5,332,343
[45] Date of Patent: Jul. 26, 1994

[54] COOLING AND DUST COLLECTING APPARATUS FOR MACHINE TOOL

[75] Inventors: Fumio Watanabe, Utsunomiya; Masanori Hosoi, Tochigi, both of Japan

[73] Assignee: Fuji Jukogyo Kabushiki Kaisha, Tokyo, Japan

[21] Appl. No.: 100,417

[22] Filed: Aug. 2, 1993

[30] Foreign Application Priority Data

Aug. 6, 1992 [JP] Japan .................. 4-210464

[51] Int. Cl.$^5$ .......................................... B23Q 11/10
[52] U.S. Cl. .................... 409/136; 408/56; 408/61; 408/67; 409/137
[58] Field of Search ............... 409/135, 136, 137; 408/56, 61, 67

[56] References Cited

U.S. PATENT DOCUMENTS

| 4,037,982 | 7/1977 | Clement | 409/137 |
| 4,340,326 | 7/1982 | Buonauro et al. | 408/67 |
| 4,915,550 | 4/1990 | Arai et al. | 408/67 |

FOREIGN PATENT DOCUMENTS

| 3733534 | 4/1989 | Fed. Rep. of Germany | 408/67 |
| 58-59746 | 4/1983 | Japan . | |
| 63-300807 | 12/1988 | Japan . | |
| 3-3713 | 1/1991 | Japan . | |
| 921780 | 4/1982 | U.S.S.R. | 408/56 |

Primary Examiner—Daniel W. Howell
Attorney, Agent, or Firm—Beveridge, DeGrandi, Weilacher & Young

[57] ABSTRACT

A cooling and dust collecting apparatus for machine tool for cooling a cutter mounted on a rotating spindle and for sucking and exhausting cutting chips to the outside of the apparatus is disclosed, which comprises a cooling and dust collecting housing surrounding the rotating spindle and the cutter, a plurality of cold air passages, defined inside the housing, for sending cold air of a pressurized cold air supply portion disposed as an external device to a first cold air delivery hole and a plurality of second cold air delivery holes, a cutting chip exhaust passage, defined in the housing, for connecting a cutting chip sucking device disposed as an external device to an inner space of the housing, and an elastic hood downwardly extending from the lower end of the housing, the elastic hood defining slits at the lower end thereof, wherein the first cold air delivery holes are adapted to blow pressurized cold air toward a shaft portion of the cutter, and wherein the second cold air delivery holes are adapted to blow pressurized cold air in downwardly inclined tangent direction of the outer periphery of the cutting portion of the cutter.

4 Claims, 11 Drawing Sheets

FIG. 12

COOLING AND DUST COLLECTING APPARATUS FOR MACHINE TOOL

BACKGROUND OF THE INVENTION

1. Field of the Invention

The present invention relates to a cooling and dust collecting apparatus for machine tool which cools a cutter and exhausts cutting chips.

2. Description of the Related Art

Thus far, various types of cooling and dust collecting apparatuses for machine tools have been proposed. For example, in Japanese Patent Laid-Open Publication No. 58-59746, a cooling and dust collecting apparatus is disclosed. In the apparatus, a drill is surrounded by a hood. By spraying mist of a cutting oil toward the center of the drill from four positions, the drill is cooled. In addition, by sucking the mist of cutting oil and cutting chips in the hood, they are exhausted from a dust collecting duct.

Moreover, in Japanese Patent Laid Open Publication Nos. 63-300807 and 3-3713, pressure foot for printed circuit board drilling machines are disclosed. A pressure foot is connected to a cutting chip sucking device through a hose so as to keep the inside of the pressure foot in a negative pressure state. In addition, compressed air is horizontally blown from the vicinity of the front end of the pressure foot in the tangent direction of the drill. The compressed air expands in the pressure foot in heat resisting state, thereby sharply lowering the temperature therein and blowing cutting chips. Thus, the cutting chips can be exhausted to the cutting chip sucking device.

However, in the above-mentioned cooling and dust collecting apparatuses for machine tools, since mist of cutting oil or compressed air is blown to a cutter in nearly horizontal direction, a portion of the cutter which is exposed is cooled, whereas a portion which is hidden in a workpiece is not cooled. In addition, cutting chips which are caught in a hole or groove are not exhausted.

Moreover, causes of heating of the cutter are cutting heat and heat conducted from a driving portion of the cutter. In the conventional cooling and dust collecting apparatuses for machine tools, the heat conducted from the driving portion of the cutter is not considered. Thus, the cutter is not satisfactorily cooled.

Therefore, an object of the present invention is to provide a cooling and dust collecting apparatus for machine tool which cools both portions of a cutter which are exposed and hidden in a workpiece, protects heat of a cutter driving portion from being conducted to the cutter, and exhausts cutting chips caught in a hole or groove.

SUMMARY OF THE INVENTION

The present invention is a cooling and dust collecting apparatus for machine tool for cooling a cutter mounted on a rotating spindle and for sucking and exhausting cutting chips to the outside of the apparatus, comprising a cooling and dust collecting housing surrounding the rotating spindle and the cutter, a plurality of cold air passages, defined inside the housing, for sending cold air of a pressurized cold air supply portion disposed as an external device to a first cold air delivery hole and a plurality of second cold air delivery holes, a cutting chip exhaust passage, defined in the housing, for connecting a cutting chip sucking device disposed as an external device to an inner space of the housing, and an elastic hood downwardly extending from the lower end of the housing, the elastic hood defining slits at the lower end thereof, wherein the first cold air delivery holes are adapted to blow pressurized cold air toward a shaft portion of the cutter, and wherein the second cold air delivery holes are adapted to blow pressurized cold air in downwardly inclined tangent direction of the outer periphery of the cutting portion of the cutter.

In this construction, the second cold air delivery portion has at least three delivery holes which are equally spaced in the peripheral direction. Each of delivery holes preferably blows the cold air from the reverse direction of the rotation of the cutter in the tangent direction of the outer periphery of the cutting portion of the cutter.

In addition, an inner hood is preferably disposed inside the elastic hood. The lower end of the inner hood is preferably disposed at a position higher than the lower end of the flexible hood.

The cold air is preferably free from moisture, oil, and dust and cooled at 5° to −15° C.

Pressurized air flows from a cold air intake portion to a plurality of cold air passages. While the pressurized cold air is being sent to the cold air passages, it cools the housing of the cooling and dust collecting apparatus and is blown from the first and second cold air delivery holes. The cold air blown from the first cold air delivery hole flows to the shaft portion of the cutter and cools it so as to prevent heat of the cutter driving portion from being conducted to the cutting portion of the cutter.

Cold air blown from the second cold air delivery holes flows in a downwardly inclined tangent direction of the outer periphery of the cutting portion of the cutter so as to cool the cutting portion. The cold air in the downwardly inclined direction blown from the second cold air delivery holes causes cutting chips in the hole or groove to float and exhausts them to the outside of the apparatus.

Along with the cutting chips, the cold air which has cooled the shaft portion and cutting portion of the cutter flows from an exhaust port to an external cutting chip sucking device through a cutting chip exhaust passage.

As the cold air is sucked, fresh air flows to the inside of the housing of the cooling and dust collecting apparatus through slits of an elastic hood so as to help exhaust the cutting chips to the cutting chip exhaust passage and to cool the inside of the housing.

According to the present invention, the first cold air delivery hole blows pressurized cold air to the shaft portion of the cutter. The second cold air delivery hole blows the pressured cold air in a downwardly inclined tangent direction of the outer periphery of the cutting portion of the cutter, thereby preventing heat of the cutter driving portion from being conducted to the cutter. Thus, both portions of a cutter which are exposed and hidden in a workpiece can be satisfactorily cooled. In addition, cutting chips in a hole or groove can be removed. Moreover, since cold air passages are defined in the housing of the cooling and dust collecting, when cold air flows in the cold air passages, the housing is cooled, thereby further cooling the cutter.

Furthermore, since the cutter is satisfactorily cooled, the wearing of the cutter is decreased, thereby remarkably prolonging the service life of the cutter, decreasing the amount of cutting chips, and easily exhausting them.

These and other objects, features and advantages of the present invention will become more apparent in light of the following detailed description of a best mode embodiment thereof, as illustrated in the accompanying drawings.

DESCRIPTION OF PREFERRED EMBODIMENT

Next, with reference to FIGS. 1 to 12, a cooling and dust collecting apparatus for machine tool according to an embodiment of the present invention will be described.

Figure 1:
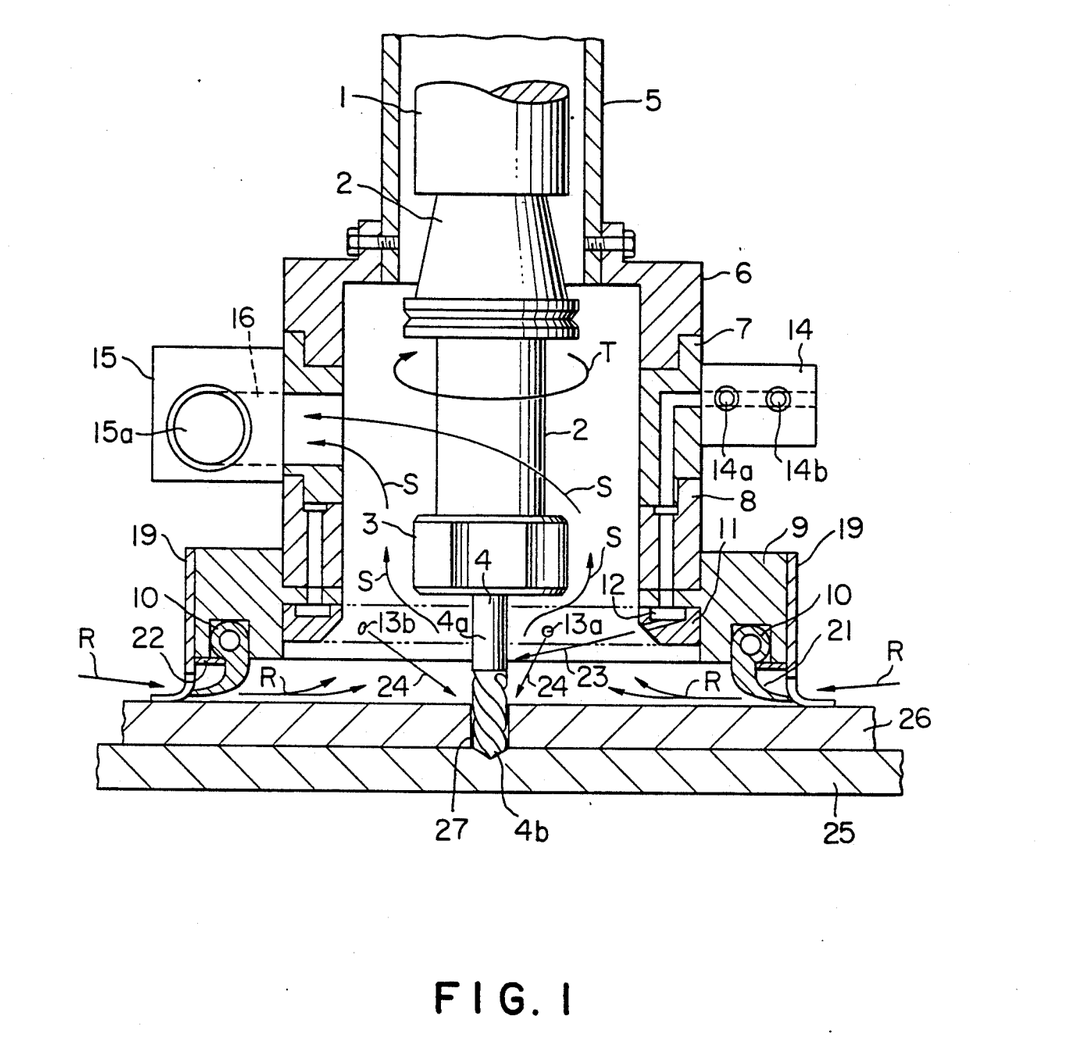
FIG. 1 is a vertical sectional view schematically showing a cooling and dust collecting apparatus for machine tool according to an embodiment of the present invention.
Figure 2:
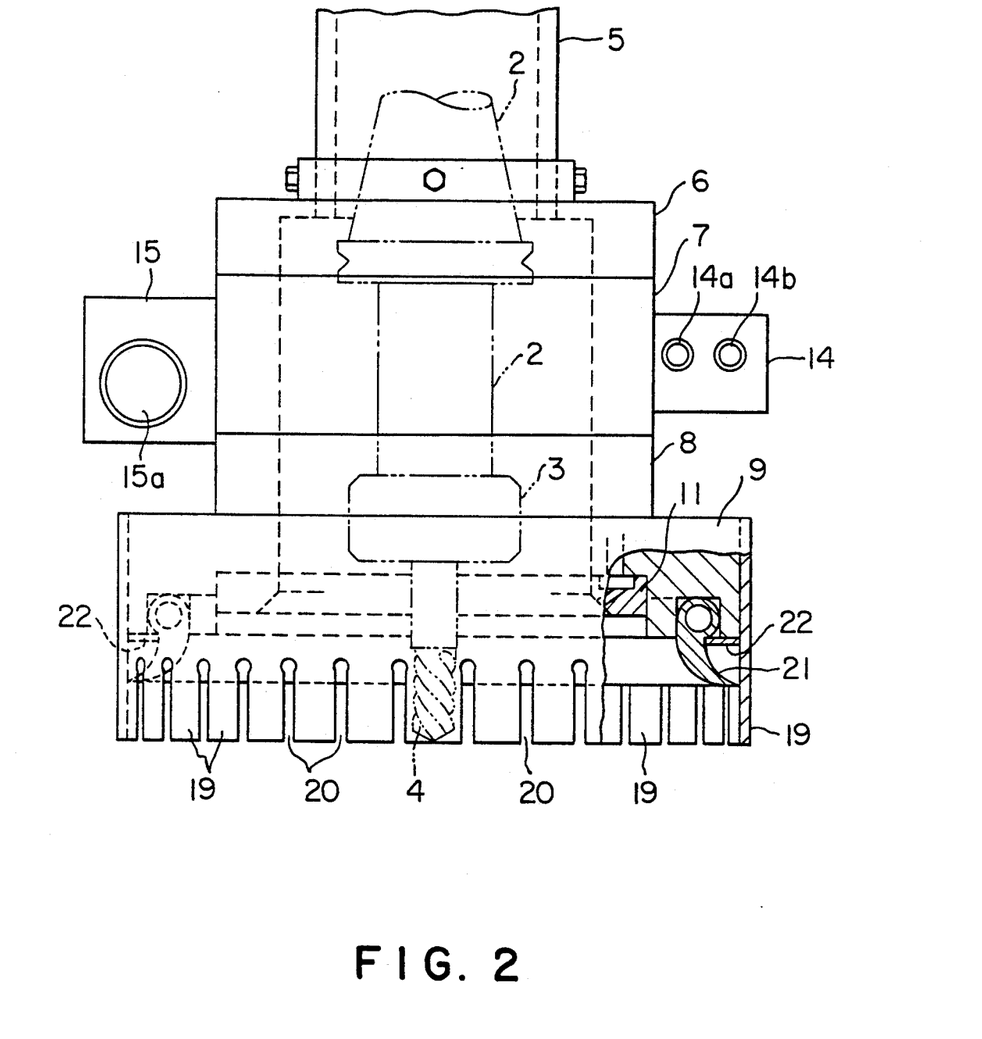
FIG. 2 is a partial sectional front view of FIG. 1.

As shown in FIGS. 1 and 2, a spindle 1 of a cutting and grinding machine such as an NC rooter is connected to an arbor 2. An end of the arbor 2 is connected to a cutter 4 through a collet 3. The spindle 1 and the arbor are concentrically surrounded by a fixed holding vessel 5. The lower end of the fixed holding vessel 5 is secured to an upper mounting member 6 with bolts. The lower end of the upper mounting member 6 is secured to an intermediate mounting member 7. A lower end portion of the intermediate mounting member 7 is secured to a lower mounting member 8. The lower end of the lower mounting member 8 is secured to a hood mounting member 9. The lower surface of the hood mounting member 9 defines a ring-shaped inner hood mounting groove 10. Inside the hood mounting member 9, a cold air delivery ring 11 is disposed. The cold air delivery ring 11 concentrically surrounds the cutter 4. The upper mounting member 6, the intermediate mounting member 7, the lower mounting member 8, and the hood mounting member 9 are tandem-connected in this order. Thus, these members 6, 7, 8, and 9 which concentrically surround the arbor 2 and the cutter 4 construct a housing 30 of the cooling and dust collecting apparatus.

Figure 3A:
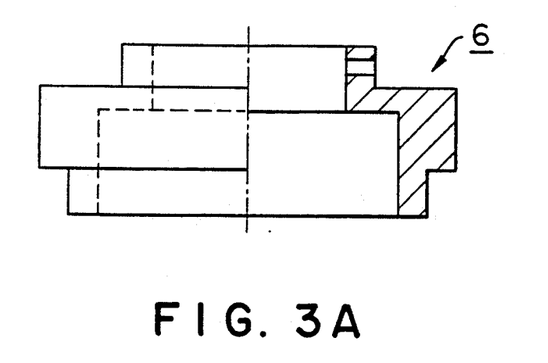
FIGS. 3A and 3B are a partial sectional front view and a bottom view of an upper mounting member.
Figure 3B:
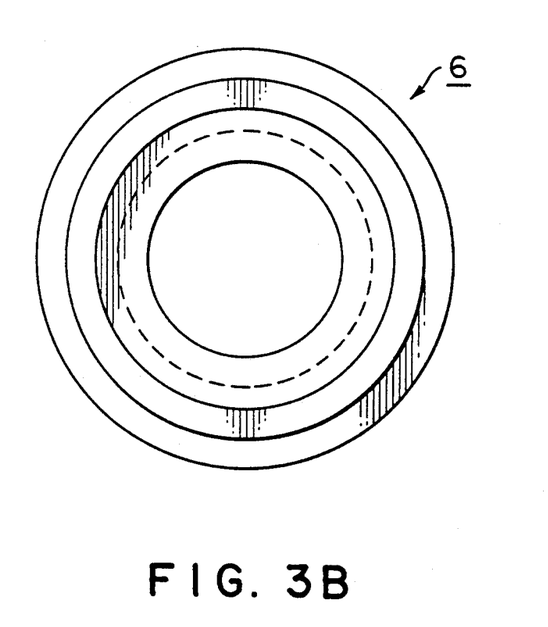

FIGS. 3A and 3B show the upper mounting member 6.

Figure 4A:
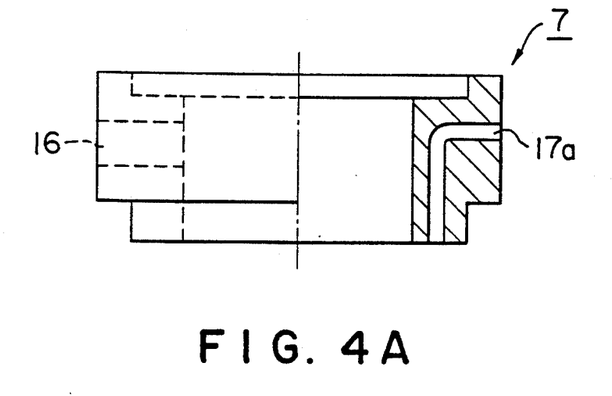
FIGS. 4A and 4B are a partial sectional front view and a bottom view showing an intermediate mounting member.
Figure 4B:
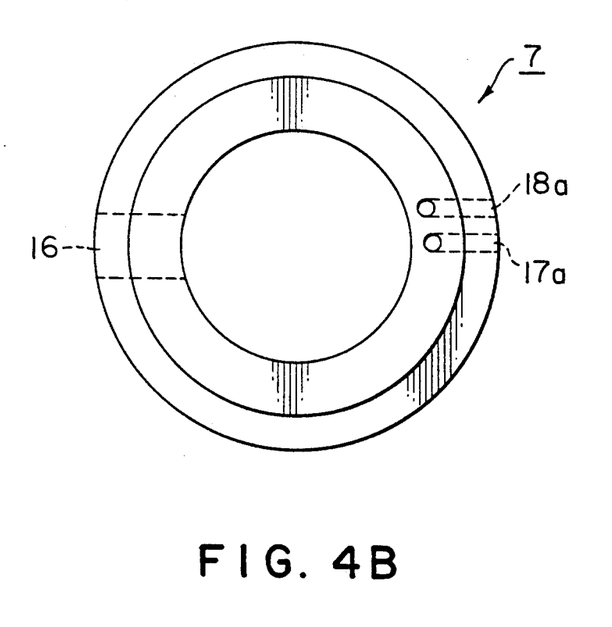

FIGS. 4A and 4B show the intermediate mounting member 7. A first cold air passage 17a and a second cold air passage 18a are defined on one side of the intermediate mounting member 7. A cutting chip exhaust passage 16 is defined on the opposed side of the first and second cold air passages 17a and 18a.

Figure 5A:
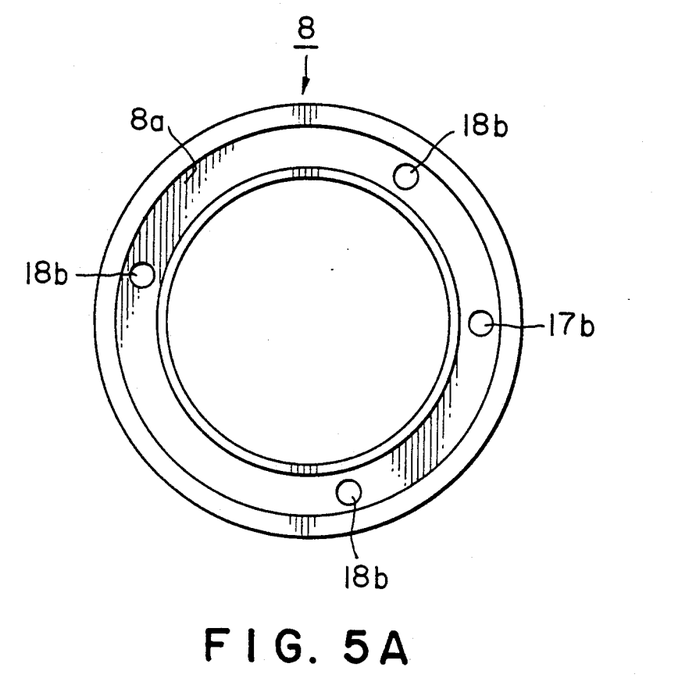
FIGS. 5A and 5B are a plan view and a partial vertical sectional view showing a lower mounting member.
Figure 5B:
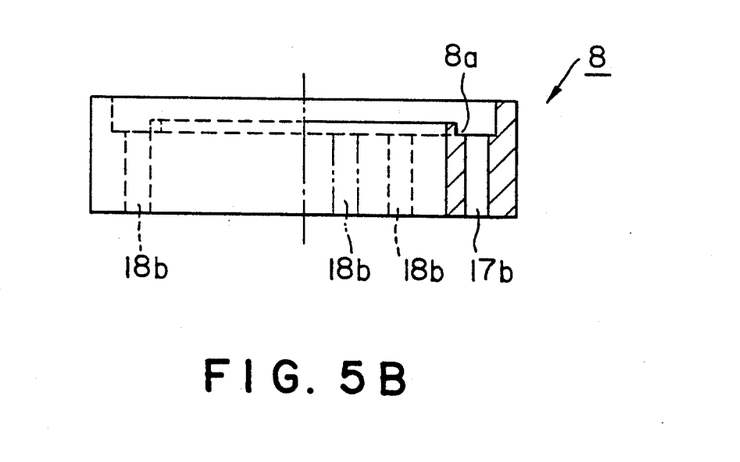

FIGS. 5A and 5B show the lower mounting member 8. A ring-shaped groove 8a is defined on the upper surface of the lower mounting member 8. On the bottom of the groove 8a, the first cold air passage 17b and three second cold air passages 18b are defined, which extend in the axial direction of the lower mounting member 8.

Figure 6A:
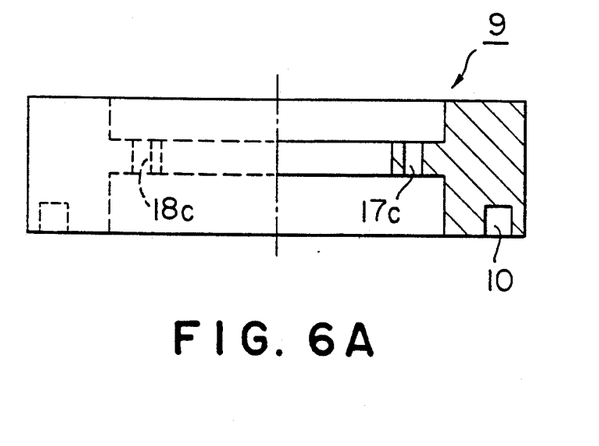
FIGS. 6A and 6B are a partial vertical sectional front view and a bottom view showing a hood mounting member.
Figure 6B:
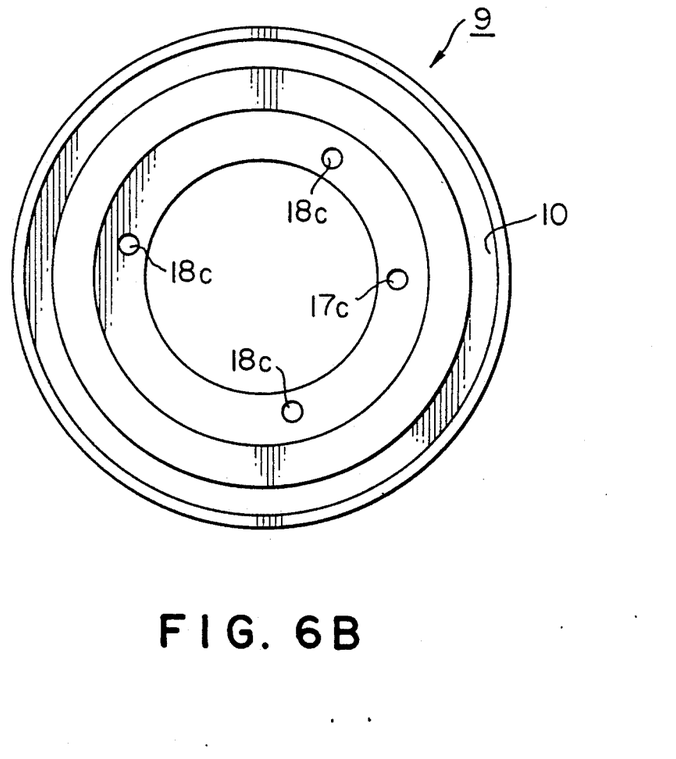

FIGS. 6A and 6B show the hood mounting member 9. A ring-shaped hood mounting groove 10 is defined in the vicinity of the outer periphery of the lower surface of the hood mounting member 9. A first cold air passage 17c and the three second cold air passages 18a, 18b, and 18c are defined inside the hood mounting groove 10. The first air passage 17c and the second cold air passages 18a, 18b, and 18c extend in the axial direction of the hood mounting member 9.

Figure 7A:
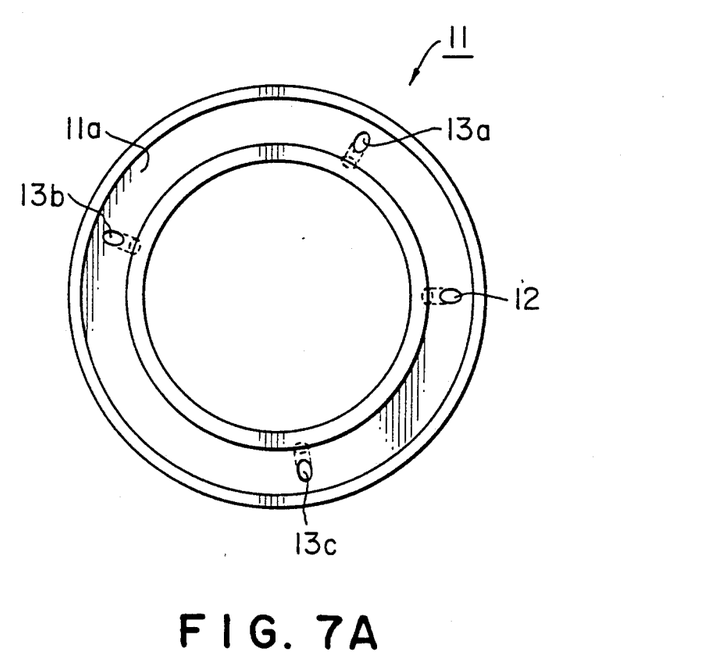
FIGS. 7A and 7B are a plan view and a partial vertical sectional front view showing a cold air delivery ring.
Figure 7B:
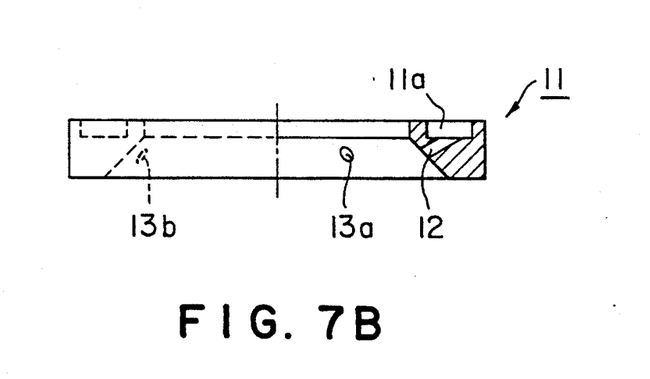

FIGS. 7A and 7B show the cold air delivery ring 11. A ring-shaped groove 11a is defined on the upper surface of the cold air delivery ring 11. One cold air delivery hole 12 and three cold air delivery holes 13a, 13b, and 13c are defined on the bottom of the cold air delivery ring 11. The three cold air delivery holes 13a, 13b, and 13c are spaced at intervals of 120°.

The first cold air passages 17a, 17b, and 17c are connected in line and thereby construct one cold air passage. On the other hand, the second cold air passages 18a, 18b, and 18c are connected in line and thereby construct one cold air passage.

Figure 8:
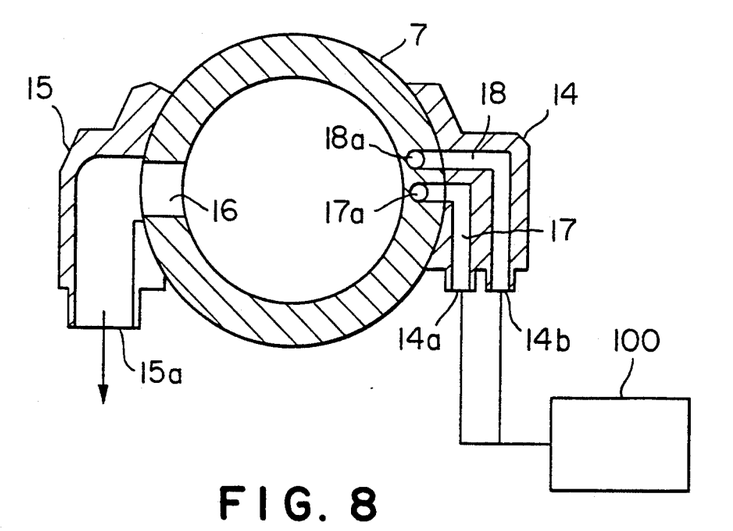
FIG. 8 is a vertical sectional view showing the intermediate mounting member, a cold air intake attachment, and a dust collecting attachment.

As shown in FIG. 8, a cold air intake attachment 14 and a dust collecting attachment 15 are disposed on the outer periphery of the intermediate mounting member 7. The first cold air passage 17 which is connected to the first cold air passage 17a is defined in the cold air intake attachment 14. Likewise, the second cold air passage 18 which is connected to the second cold air passage 18a is defined in the cold air intake attachment 14. An inlet 14a of the first cold air passage 17 and an inlet 14b of the second cold air passage 18 are connected to a pressured cold air supply portion 100 which is disposed as an external device.

An outlet 15a of the cutting chip exhaust passage 16 defined in the dust collecting attachment 15 is connected to a vacuum-type cutting chip sucking device (not shown) which is disposed as an external device.

With the first cold air passages 17a, 17b, and 17c defined in each of the cold air intake attachment 14, the intermediate mounting member 7, the lower mounting member 8, and the hood mounting member 9, the first cold air intake port 14a of the cold air intake attachment 14 is connected to the cold air delivery hole 12 of the cold air delivery ring 11. Likewise, with the second cold air passages 18a, 18b, and 18c defined in each of the cold air intake attachment 14, the intermediate mounting member 7, the lower mounting member 8, and the hood mounting member 9, the second cold air intake port 14b of the cold air intake attachment 14 is connected to the cold air delivery holes 13a, 13b, and 13c of the cold air delivery ring 11.

Figure 9:
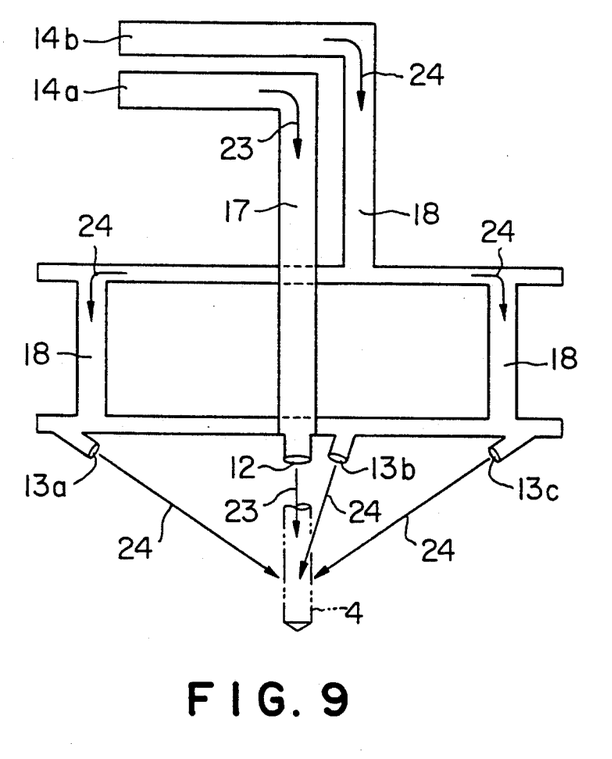
FIG. 9 is a schematic diagram showing connections of a first cold air intake port, a first cold air passage, and a first cold air delivery hole, and connections of a second cold air intake port, second cold air passages, and second cold air delivery holes.

FIG. 9 is a sectional view schematically showing the connections of the first cold air intake port 14a, the first cold air passage 17, and the first cold air delivery hole 12 and the connections of the second cold air intake port 14b, the second cold air passages 18, and the cold air delivery holes 13a, 13b, and 13c.

As shown in FIGS. 1 and 2, an outer hood 19 which is made of an elastic material such as rubber is disposed on the outer periphery of the hood mounting member 9. Slits 20 are defined on the lower end of the outer hood 19. The upper end of an inner hood 21 made of an elastic material such as rubber is inserted into an inner hood mounting groove 10 of the hood mounting member 9. The inner hood 21 is secured to the hood mounting member 9 by an inner hood fixing ring 22 shown in FIGS. 1 and 2.

Figure 10A:
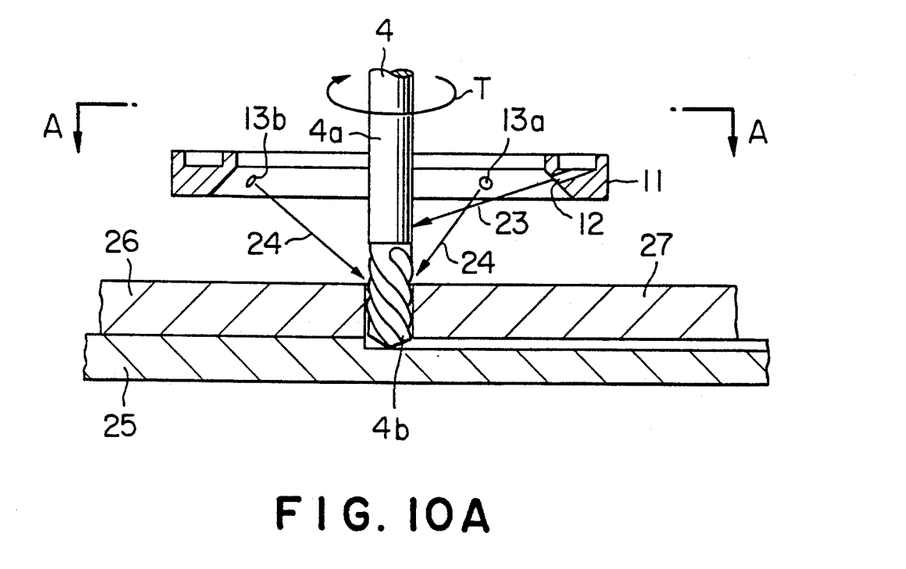
FIGS. 10A and 10B are a sectional view and a plan view taken along line A—A showing positions of the cold air delivery ring and the cutter of the embodiment.
Figure 10B:
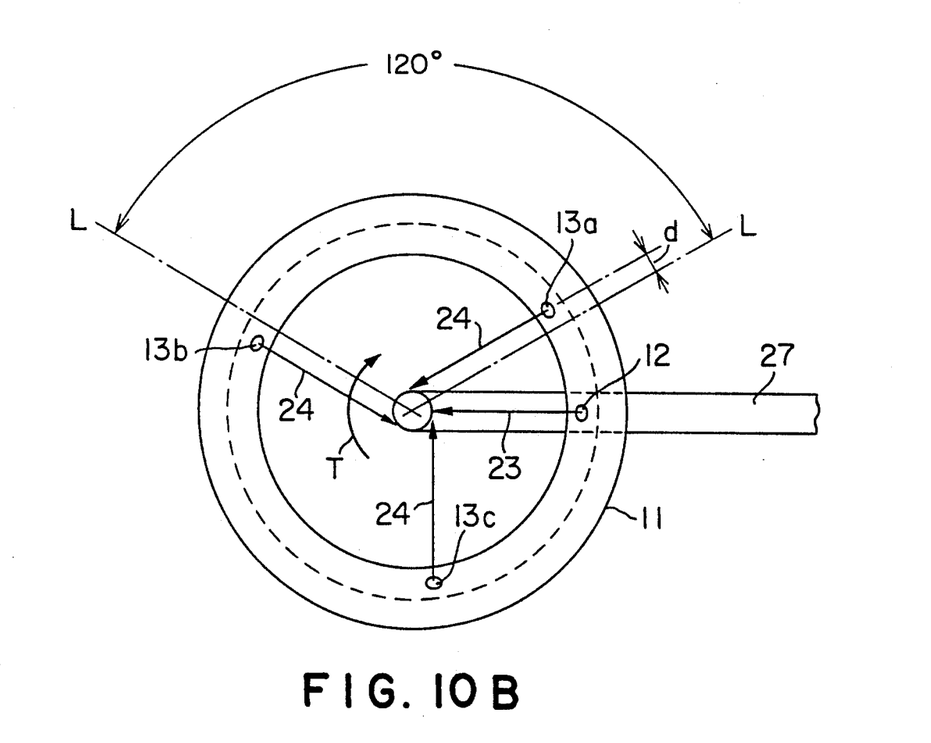

FIGS. 10A and 10B show the positions of the cold air delivery holes 12, 13a, 13b, and 13c defined in the cold air delivery ring 11 and directions of cold air blown therefrom.

In the figure, the cold air delivery hole 12 is oriented in the direction of the center axis of the cutter 4. The cold air delivery hole 12 blows first cold air 23 toward the shaft portion 4a of the cutter 4. On the other hand, the cold air delivery holes 13a, 13b, and 13c which are spaced at intervals of 120° and blow second cold air 24 in their downwardly (nearly 45°) inclined tangent directions of the outer periphery of the cutting portion 4b of the cutter 4, these directions being the reverse of a rotating direction T of the cutter 4.

The positions of the cold air delivery holes 13a, 13b, and 13c against the cutter 4 are defined as follows. Now assume that a line extending from the center of the cutter 4 in the radial direction is L. There are three lines L and the angle made of the adjacent two lines L are is 120°. Each of the cold air delivery holes 13a, 13b, and 13c is defined at a position spaced by the diameter d of the cutter 4 in the reverse direction of the rotating direction of the cutter 4. The respective orientations of the cold air delivery holes 13a, 13b, and 13c are in parallel with their radial lines L so that their second cold air 24 is blown nearly in parallel with the corresponding radial line L.

Figure 11:
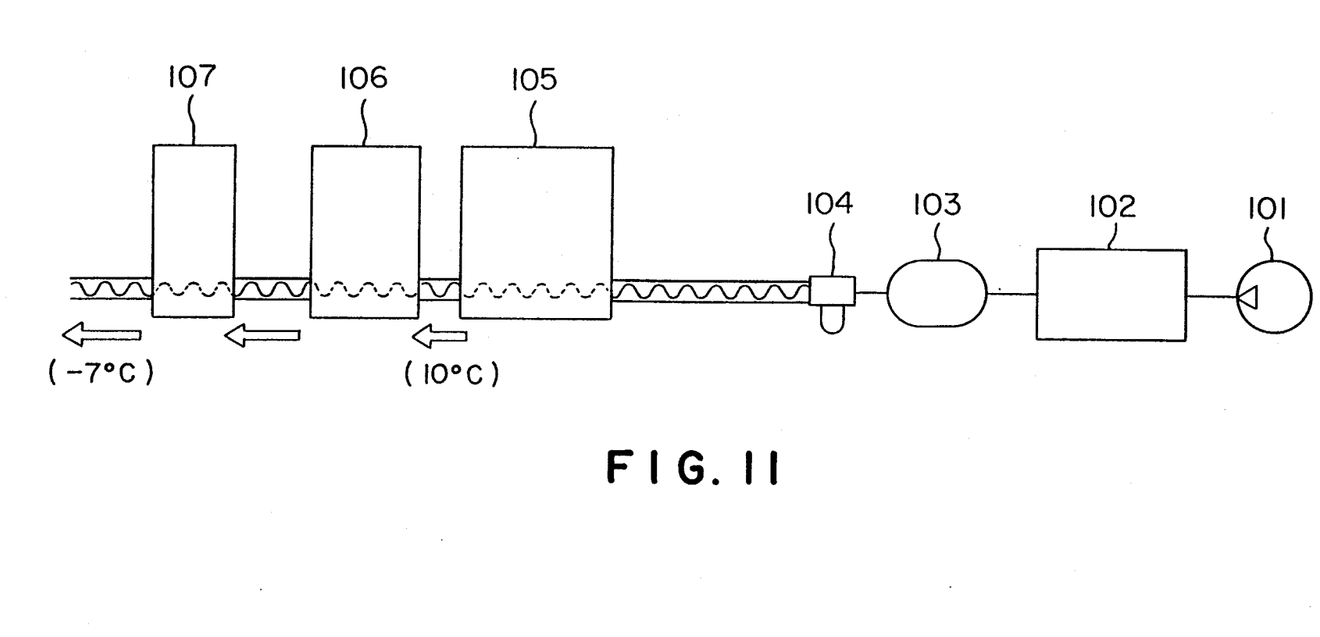
FIG. 11 is a block diagram showing the construction of a pressured cold air supply portion of the embodiment.

FIG. 11 is a block diagram showing the construction of the pressured cold air supply portion 100 which is shown as a block in FIG. 8. The pressurized cold air supply portion 100 comprises a compressor 101, an after-cooler 102, an air tank 103, a main filter 104, an air dryer 105, a regulator/drain 106, and a cooler 107. The compressor 101, the after-cooler 102, the air tank 103, and the main filter 104 produce dust-free utility air with a pressure of 5 kg/cm². This utility air is sent to the air dryer 105. The air dryer 105 demoisturizes the utility air and cools it to 10° C. Thereafter, this utility air is sent to the regulator/drain 106. The regulator/drain 106 removes oil from the utility air. Thereafter, the utility air is sent to the cooler 107. The cooler 107 cools the utility air to −7° C. The pressured cold air at −7° C. is supplied to the first and second cold air intake ports 14a and 14b of the cold air intake attachment 14.

Next, the operation of the embodiment will be described.

Figure 12:
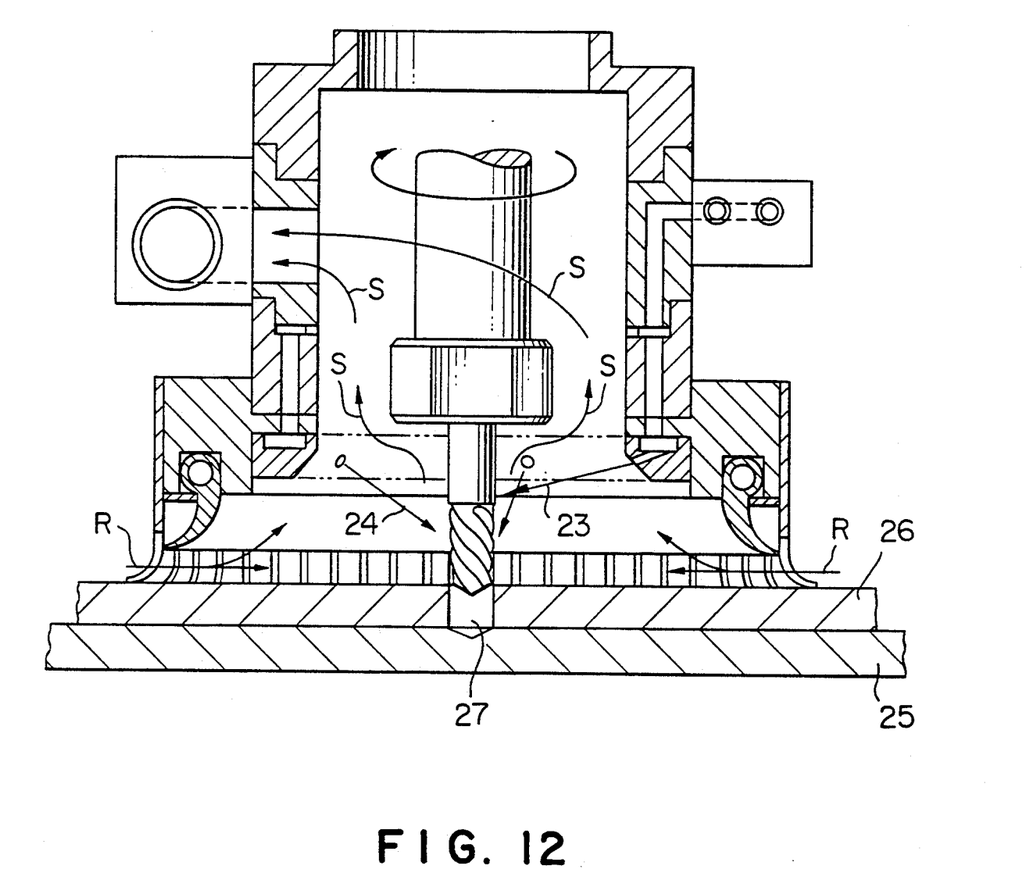
FIG. 12 is a sectional view showing a completion state of a cutting operation of the embodiment.

FIG. 1 shows the state where the cutter is working.
FIG. 12 shows the state where the cutting operation has been completed and the cutter is being left from a workpiece.

In FIG. 1, the cutting chip sucking device (not shown) is operated so as to vacuum suck air from the inside of the housing of the cooling and dust collecting apparatus. In addition, the pressured air of the pressured cold air supply portion 100 is supplied to the first and second cold air intake ports 14a and 14b of the cold air intake attachment 14. In this conditions, the cutter 4 cuts a workpiece 26 fixed on an auxiliary member 25 and makes a hole or groove 27.

The first cold air 23 supplied to the first cold air intake port 14a is blown from the cold air delivery hole 12 of the cold air delivery ring 11 through the first cold air passage 17. The first cold air 23 flows to the shaft portion 4a of the cutter 4. Thus, the first cold air 23 cools heat conducted from the cutter drive portion to the cutter 4, thereby preventing the cutter 4 from being heated by such heat conduction.

The second cold air 24 supplied to the second cold air intake port 14b is blown downwardly with a angle of approximately 45° from the cold air delivery holes 13a, 13b, and 13c of the cold air delivery ring 11 through the second cold air passages 18. The second cold air 24 cools the cutting portion 4b of the cutter 4 and removes burrs from the hole or groove 27.

Since the second cold air 24 is blown from the three cold air delivery holes 13a, 13b, and 13c which are spaced at intervals of 120°, at least one of the three holes 13a, 13b, and 13c blows the second cold air 24 into the hole or groove 27, thereby causing cutting chips therein to float and flow to the outside. In addition, the second cold air 24 flows in the tangent direction of the outer periphery of the cutter 4, this direction being the reverse of the rotating direction of the cutter 4. Thus, the second cold air 24 securely peels cutting chips which stick on the cutting portion 4b of the cutter 4. As shown in FIG. 12, these exhaust and peeling operations are effectively performed when the cutter 4 is being left from the workpiece 26 after the cutting operation has been completed.

The first cold air 23 and the second cold air 24 which have cooled the shaft portion 4a and the cutting portion 4b of the cutter 4 are sucked along with the cutting chips by the cutting chip sucking device from the cutting chip exhaust outlet 15a through the cutting chip exhaust passage 16 as represented by arrow S.

As the cold air is sucked, fresh air is drawn to the inside of the housing of the cooling and dust collecting apparatus through the slits 20 of the elastic hood 19 as represented by arrow R shown in FIGS. 1 and 12. The air R not only accelerates the exhausting of the cutting chips to the cutting chip exhaust passage 16, but also cools the inside of the housing of the cooling and dust collecting apparatus. The housing is cooled by the first cold air 23 and the second cold air 24 which respectively flow in the cold air passages 17 and 18. Since the housing itself and the inner space thereof are individually cooled, the cutter 4 is more effectively cooled by the first cold air 23 and the second cold air 24.

The outer hood 19 and the inner hood 21 in cooperation prevents cutting chips from leaking to the outside.

As a workpiece, any material such as metal, compound, wood, and stone may be used.

The number, positions, orientations, and so forth of the cold air delivery holes 12, 13a, 13b, and 13c of the cold air delivery ring 11 are determined corresponding to various conditions such as the thickness of a workpiece and the size of a hole or groove to be made thereon. Thus, a plurality of cold air delivery rings 11 corresponding to various cutting conditions may be required. In this case, a cold air delivery ring 11 which meets required cutting conditions can be used. However, even if the cutting conditions are changed, by using a proper cold air delivery ring 11, a cutting operation corresponding to these conditions can be performed without changes and/or replacement of other members.

In the above-described embodiment, the pressure and temperature of the first cold air 23 were the same as those of the second cold air 24. However, it should be noted that the present invention is not limited to these conditions. Rather, the pressure and/or temperature of the first cold air 23 may be different from the pressure and/or temperature of the second cold air 24.

The pressure and temperature of the first cold air 23 and the second cold air 24 may be determined by required cutting conditions. The temperatures of the first cold air 23 and the second cold air 24 are preferably in the range from 5° to −15° C. In particular, with cold air at a temperature of 5° C. or below, the service life of the cutter can be remarkably prolonged, for example, approximately six times than with that at ambient temperature. In addition, to improve the heat insulating effect of the inside of the constructional members 5, 7, 8, and 9 of the cooling and dust collecting housing, an adhesive agent made of silicone rubber is preferably applied between the contact faces of each constructional member.

The apparatus according to the present invention is also applicable for a hand dril.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A cooling and dust collecting apparatus for machine tool for cooling a cutter mounted on a rotating spindle and for sucking and exhausting cutting chips to the outside of said apparatus, said apparatus comprising:
   a cooling and dust collecting housing surrounding said spindle and said cutter;
   cold air passage means defined inside said housing for supplying cold air of a pressurized cold air supply portion disposed as an external device to a first cold air delivery hole and a plurality of second cold air delivery holes;
   cutting chip exhaust passage means defined in said housing for connecting a cutting chip sucking device disposed as an external device to an inner space of said housing;
   an elastic hood downwardly extending from the lower end of said housing, said elastic hood defining slits at the lower end thereof,
   said first cold air delivery hole being adapted to blow pressurized cold air toward a shaft portion of said cutter, and
   said second cold air delivery holes are adapted to blow pressurized cold air in downwardly inclined tangent direction of the outer periphery of the cutting portion of said cutter.

2. The cooling and dust collecting apparatus as set forth in claim 1, wherein said second cold air delivery holes are at least three holes spaced equally in the peripheral direction of said apparatus, each of said second cold air delivery holes being adapted to blow said pressurized cold air in the tangent direction of the outer periphery of said cutter, said direction being the reverse of the rotating direction of said cutter.

3. The cooling and dust collecting apparatus as set forth in claim 1, further comprising:
   an inner hood disposed inside said elastic hood, the lower end of said inner hood being disposed above the lower end of said elastic hood.

4. The cooling and dust collecting apparatus as set forth in claim 1, wherein said cold air is free of moisture, oil, and cutting chips and cooled in the range from 5° to −15° C.

* * * * *